US009204234B2

(12) United States Patent
Lo et al.

(10) Patent No.: US 9,204,234 B2
(45) Date of Patent: Dec. 1, 2015

(54) AUDIO TESTING SYSTEM AND METHOD

(75) Inventors: Yi Lo, New Taipei (TW); Guo-Zhong Liu, Shenzhen (CN); Hui-Ling Feng, Shenzhen (CN); Rui Deng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 652 days.

(21) Appl. No.: 13/550,242

(22) Filed: Jul. 16, 2012

(65) Prior Publication Data

US 2012/0281847 A1 Nov. 8, 2012

Related U.S. Application Data

(62) Division of application No. 12/198,031, filed on Aug. 25, 2008.

(30) Foreign Application Priority Data

Jun. 19, 2008 (CN) .......................... 2008 1 0302233

(51) Int. Cl.
*G06F 17/00* (2006.01)
*H04R 29/00* (2006.01)

(52) U.S. Cl.
CPC ..................................... *H04R 29/00* (2013.01)

(58) Field of Classification Search
CPC ....................................................... H04R 29/00
USPC ........................................................... 700/94
See application file for complete search history.

(56) References Cited

U.S. PATENT DOCUMENTS

| | | | | |
|---|---|---|---|---|
| 4,713,771 | A * | 12/1987 | Crop | 702/67 |
| 6,137,992 | A * | 10/2000 | Mohan et al. | 455/67.12 |
| 6,512,472 | B1 * | 1/2003 | Smith et al. | 341/155 |
| 6,668,027 | B1 * | 12/2003 | Scarpa | 375/345 |
| 7,546,173 | B2 * | 6/2009 | Waserblat et al. | 700/94 |
| 8,036,765 | B2 * | 10/2011 | Joly | 700/94 |
| 8,126,578 | B2 * | 2/2012 | Atlas et al. | 700/94 |
| 2002/0131604 | A1 * | 9/2002 | Amine | 381/58 |
| 2002/0188365 | A1 * | 12/2002 | Kuwaoda | 700/94 |
| 2005/0063276 | A1 * | 3/2005 | Ogura | 369/59.22 |
| 2006/0147032 | A1 * | 7/2006 | McCree et al. | 379/406.08 |
| 2006/0212295 | A1 * | 9/2006 | Wasserblat et al. | 704/252 |
| 2007/0047731 | A1 * | 3/2007 | Lipari, III | 379/406.01 |
| 2007/0293960 | A1 * | 12/2007 | Fujii | 700/94 |
| 2008/0120528 | A1 * | 5/2008 | Sawada | 714/780 |
| 2008/0137873 | A1 * | 6/2008 | Goldstein | 381/57 |
| 2010/0198377 | A1 * | 8/2010 | Seefeldt et al. | 700/94 |
| 2011/0032793 | A1 * | 2/2011 | Moore et al. | 367/13 |

OTHER PUBLICATIONS

AP 2700 manual; copyright 2004 and available for sale at least 2007.*
AP 2700 datasheet; available for sale at least 2007.*

* cited by examiner

*Primary Examiner* — Paul McCord
(74) *Attorney, Agent, or Firm* — Novak Druce Connolly Bove + Quigg LLP

(57) ABSTRACT

An audio testing system is configured for receiving an audio signal from an audio emitting device. The system samples the audio signal and obtains sampling points from the audio signal for determining if the audio signal has been distorted. A related method is also disclosed.

5 Claims, 5 Drawing Sheets

AUDIO TESTING SYSTEM AND METHOD

CROSS REFERENCE TO RELATED APPLICATIONS

This present application is a divisional application of U.S. patent application, entitled "AUDIO TESTING SYSTEM AND METHOD", with application Ser. No. 12/198,031, filed on Aug. 25, 2008, which claims foreign priority based on Chinese Patent application No. 200810302233.1, filed in China on Jun. 19, 2008. The contents of the above-referenced applications are hereby incorporated by reference. Relevant subject matter is disclosed in the co-pending U.S. patent applications Ser. No. 13/550,236 having the same title and assigned to the same assignee as named herein.

BACKGROUND

1. Field of the Invention

Embodiments of the present disclosure relate to testing audio systems, and more particularly to an audio testing system and method.

2. Description of Related Art

An audio signal from a set-top-box (STB) requires thorough testing to guarantee the quality of the audio signal. A break, a pause, or a spike in the flow of the audio signal indicates that the audio signal from the STB has been distorted.

At the present time, the audio signal from the STB is tested manually or via expensive machinery. Manual tests are very time-consuming and are likely to produce inaccurate results, while tests conducted via machinery are too costly. Furthermore, extended exposure to audio signal testing may have harmful effects on the testers' health.

What is needed, therefore, is an audio testing system and method to address the aforementioned deficiencies.

DETAILED DESCRIPTION

Figure 1:
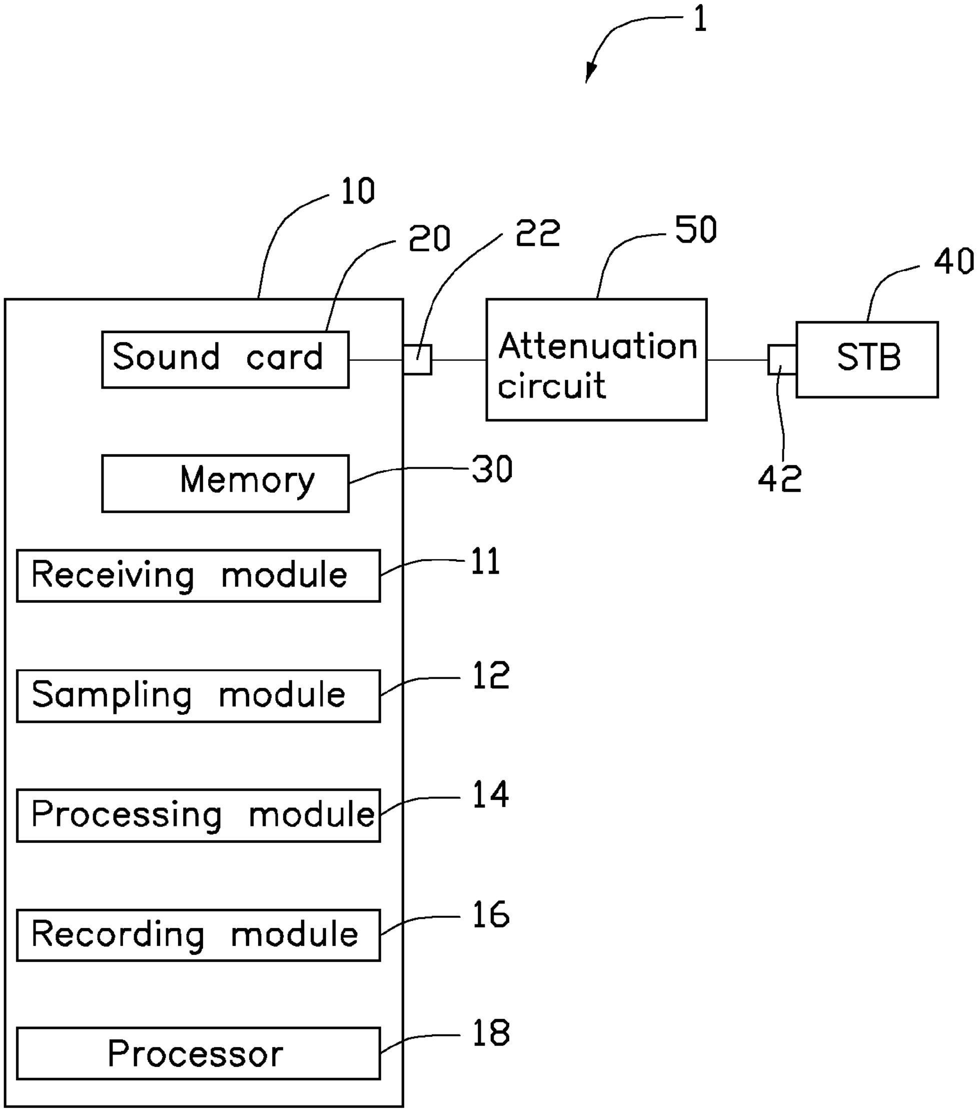
FIG. 1 is a block diagram of an audio testing system in accordance with an embodiment of the present disclosure.

FIG. 1 is a block diagram of an audio testing system 1 in accordance with an embodiment of the present disclosure. In one embodiment, the audio testing system 1 includes a computer system 10 comprising a sound card 20 and a memory 30. The audio testing system 1 is electronically connected to an audio-emitting device, such as a set-top-box (STB) 40, and an attenuation circuit 50. An audio output jack 42 of the STB 40 is coupled to a line input jack 22 of the sound card 20 via the attenuation circuit 50. An audio signal from the STB 40 may be received by the attenuation circuit 50 and attenuated. The attenuated signal may then be sampled by the computer system 10 to determine if the audio signal has been distorted.

The computer system 10 comprises various modules to determine if the audio signal has been distorted. In one embodiment, the computer system 10 comprises a receiving module 11, a sampling module 12, a processing module 14, and a recording module 16. One or more general processors or specialized processors, such as a processor 18 may execute the sampling module 12, the processing module 14, and the recording module 16.

The receiving module 11 is configured for receiving an attenuated signal from the attenuation circuit 50. The sampling module 12 is configured for sampling the audio signal from the STB 40 via the sound card 20 and obtaining sampling points from the audio signal. The sampling module 12 stores the sampling points in the memory 30. The processing module 14 is configured for processing the sampling points stored in the memory 30 and determines if the audio signal is distorted. The recording module 16 is configured for recording a section of the distorted audio signal into log file. Depending on the embodiment, the memory 30 may comprise a hard disk drive, a flash drive, or a compact disc, for example.

The attenuation circuit 50 attenuates noises in the audio signal from the STB 40. In one exemplary embodiment, the computer system 10 may sample the audio signal from the STB 40 at a sampling rate of 44.1 KHz (44,100 samples per second) and a 16-bit resolution. One theoretical dynamic range of the audio signal is between −32768 and 32767.

Figure 2:
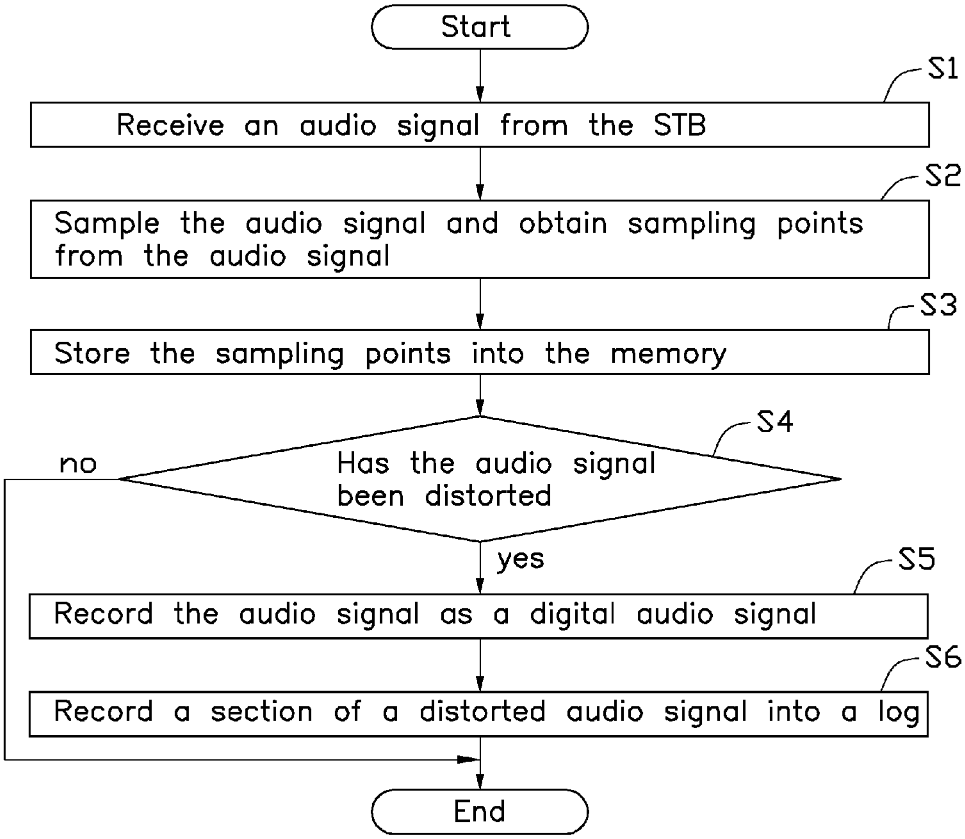
FIG. 2 is a flowchart of an audio testing method in accordance with an embodiment of the present disclosure.

FIG. 2 is a flowchart of one embodiment of an audio testing method for testing an audio signal to determine if the audio signal has been distorted. The method of FIG. 2 may be used to process an audio signal from an audio-emitting device, such as a compact disc player. Depending on the embodiment, additional steps may be added, others deleted, and the ordering of the steps may be changed.

In step S1, the STB 40 plays a sound file, such as a section of music. Accordingly, the sound emitted by the STB 40 flows are attenuated by the attenuation circuit 50 and then flows to the computer system 10 where it is received by the receiving module 11.

In step S2, the sampling module 12 samples the audio signal from the STB 40 via the sound card 20 and obtains sampling points from the sampled audio signal. It may be understood that the number of sampling points and the method of sampling may depend on different embodiments.

In step S3, the sampling module 12 stores the sampling points in the memory 30.

In step S4, the processing module 13 processes the sampling points stored in the memory 30 and determines if the audio signal has been distorted. Specifically, the processing module 13 determines if there is a break, a pause, or a spike existing in the flow of the audio signal from the STB 40.

In step S5, if the audio signal has been distorted, the recording module 16 records the audio signal as a digital audio signal, such as in a waveform audio form (way) file.

In step S6, the recording module 16 records a section of the distorted audio signal into a log file. If the audio signal from the STB 40 has been distorted, a tester can replay the way file to examine the distorted audio signal.

Figure 3:
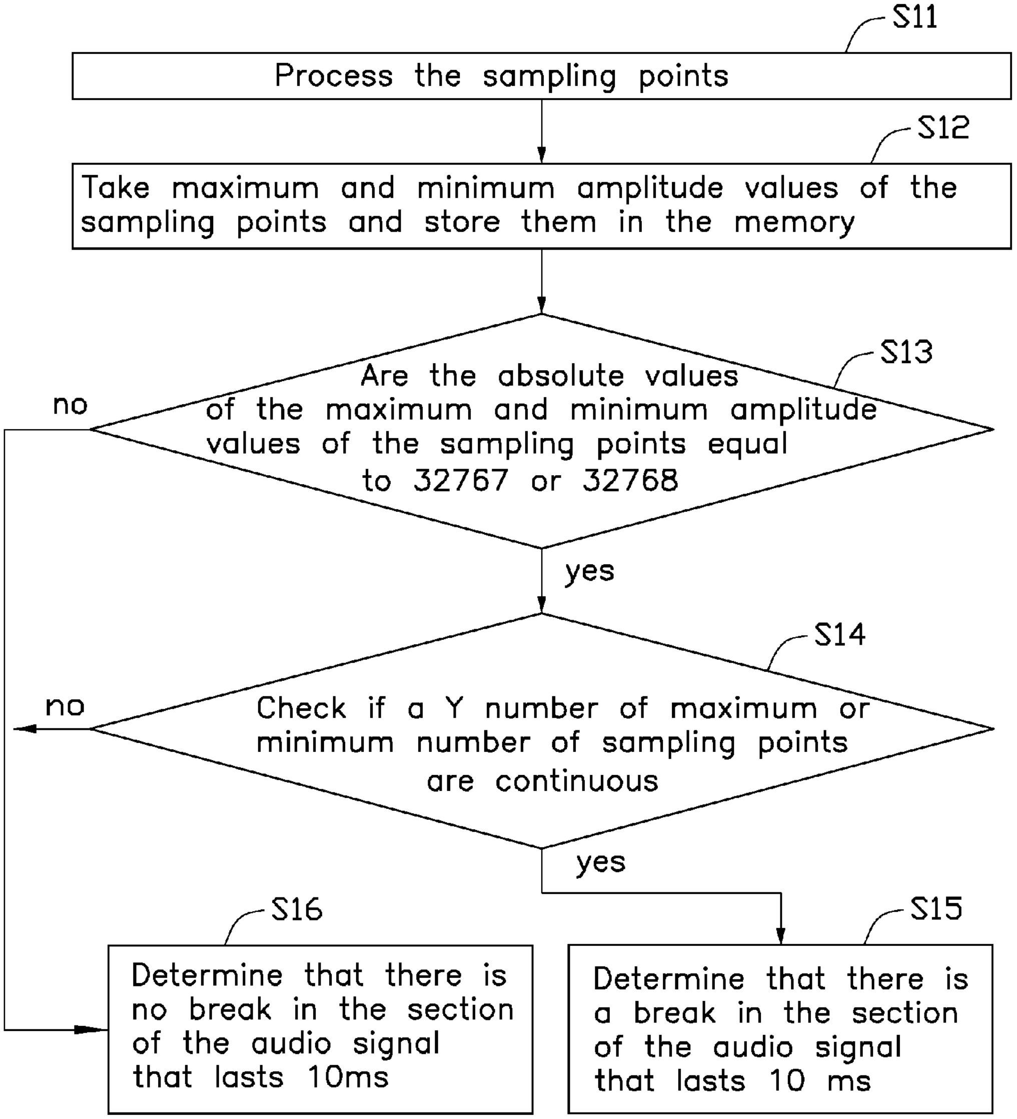
FIG. 3 is a flowchart of a method for testing the break of FIG. 2.

FIG. 3 is a flowchart of an audio testing method for testing the break in step S4 of FIG. 2. In step S11, the processing module 14 processes the sampling points stored in the memory 30 into sampling regions X. Depending on the embodiment, X may range between 5-20 ms. In the embodiment of FIG. 3, X may be equal to 10 ms. Due to the sampling rate of 44.1 KHz, there are 441 sampling points in an audio signal section that lasts 10 ms.

In step S12, the processing module 14 takes maximum amplitude values and minimum amplitude values from the 441 sampling points, and stores them in the memory 30.

In step S13, the processing module 14 processes the absolute values of the maximum amplitude values and the minimum amplitude values, and checks if the absolute values are equal to 32767 or 32768. If the absolute values are both less than 32767, the processing module 14 determines that there is no break in the audio signal section that lasts 10 ms. Subsequently, the process of testing for a break has been completed.

In step S14, if the absolute values are equal to 32767 or 32768 in one embodiment. The processing module 14 further determines if the sampling points, having the maximum absolute amplitude values or absolute minimum amplitude values, are continuous along more than a Y number of sampling points. Depending on the embodiment, Y may range between 3-10. In the embodiment of FIG. 3, Y may be equal to 5. For example, if Y is equal to 5, then there must be 5 continuous maximum absolute amplitude values or 5 continuous minimum absolute amplitude values.

In step S15, if there are more than or equal to Y number of continuous sampling points, the processing module 14 determines that there is a break in the audio signal section that lasts 10 ms. Subsequently, the process of testing for a break has been completed.

In step S16, if there are less than Y number of continuous sampling points, the processing module 14 determines that there is no break in the audio signal section that lasts 10 ms. Subsequently, the process of testing for a break has been completed.

For balancing the testing time and the test precision, X is equal to 5 ms in one embodiment. In step S14, Y may range between 3-10 based on a typical person's hearing ability. If there are less than 3 number of continuous sampling points having the maximum absolute amplitude values or absolute minimum amplitude values, it would be difficult for a typical person to identify this break.

Figure 4:
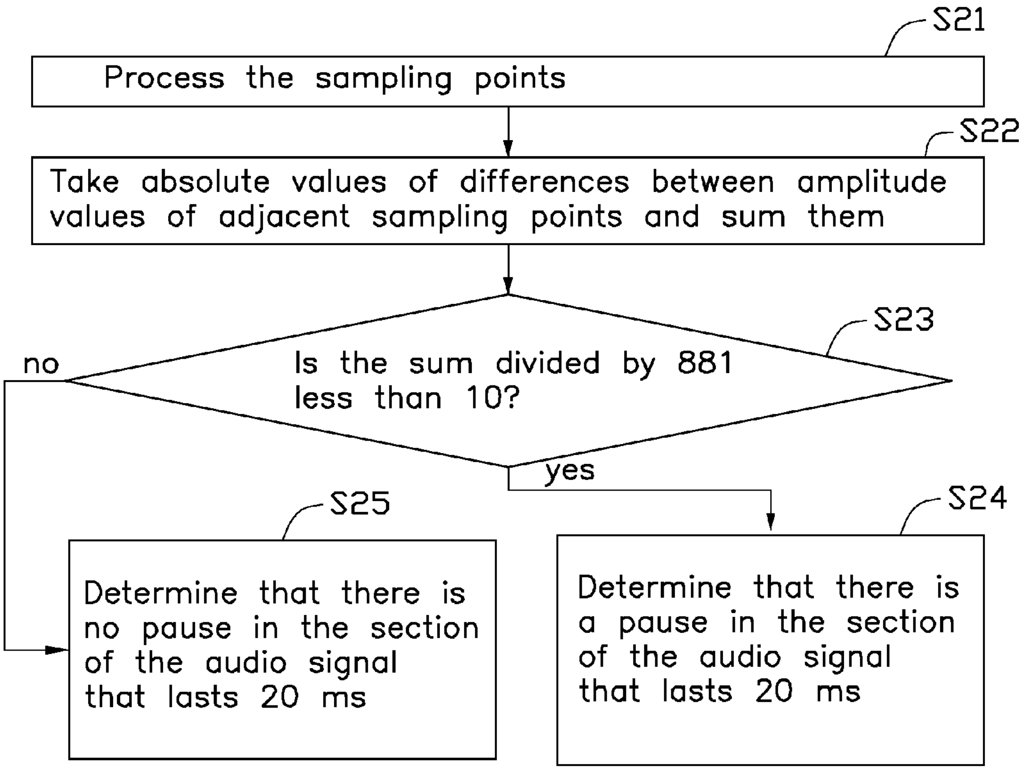
FIG. 4 is a flowchart of a method for testing the pause of FIG. 2.

FIG. 4 is a flowchart of an audio testing method for testing the pause in step S4 of FIG. 2. In step S21, the processing module 14 processes the sampling points stored in the memory 30 into sampling regions M. Depending on the embodiment, M may range between 20 ms-30 ms. In this embodiment, M is equal to 20 ms. Due to the sampling rate of 44.1 KHz, there are 882 sampling points in an audio signal section that lasts 20 ms.

In step S22, the processing module 14 takes the absolute values of differences between the amplitude values of each two adjacent sampling points, subsequently adding up all 881 absolute values, namely SUM. Next, the processing module 14 processes the average value of the 881 absolute values, namely SUM/881.

In step S23, the processing module 14 checks if SUM/881 is less than N, and N may range between 5-20. In this embodiment, N is equal to 10.

In step S24, if SUM/881 is less than 10, the processing module 14 determines that there is a pause in the audio signal section that lasts 20 ms.

In step S25, if SUM/881 is equal to or more than 10, the processing module 14 determines that there is no pause in the audio signal section that lasts 20 ms.

It may be understood that M may range from 20-30 ms based on a typical person's hearing ability. If the pause in audio lasts less than 20 ms, it would be difficult for a typical person to identify this pause. In step S23, N should be equal to 0. In this embodiment, because of the direct current bias in the testing system, N may range between 5-20.

Figure 5:
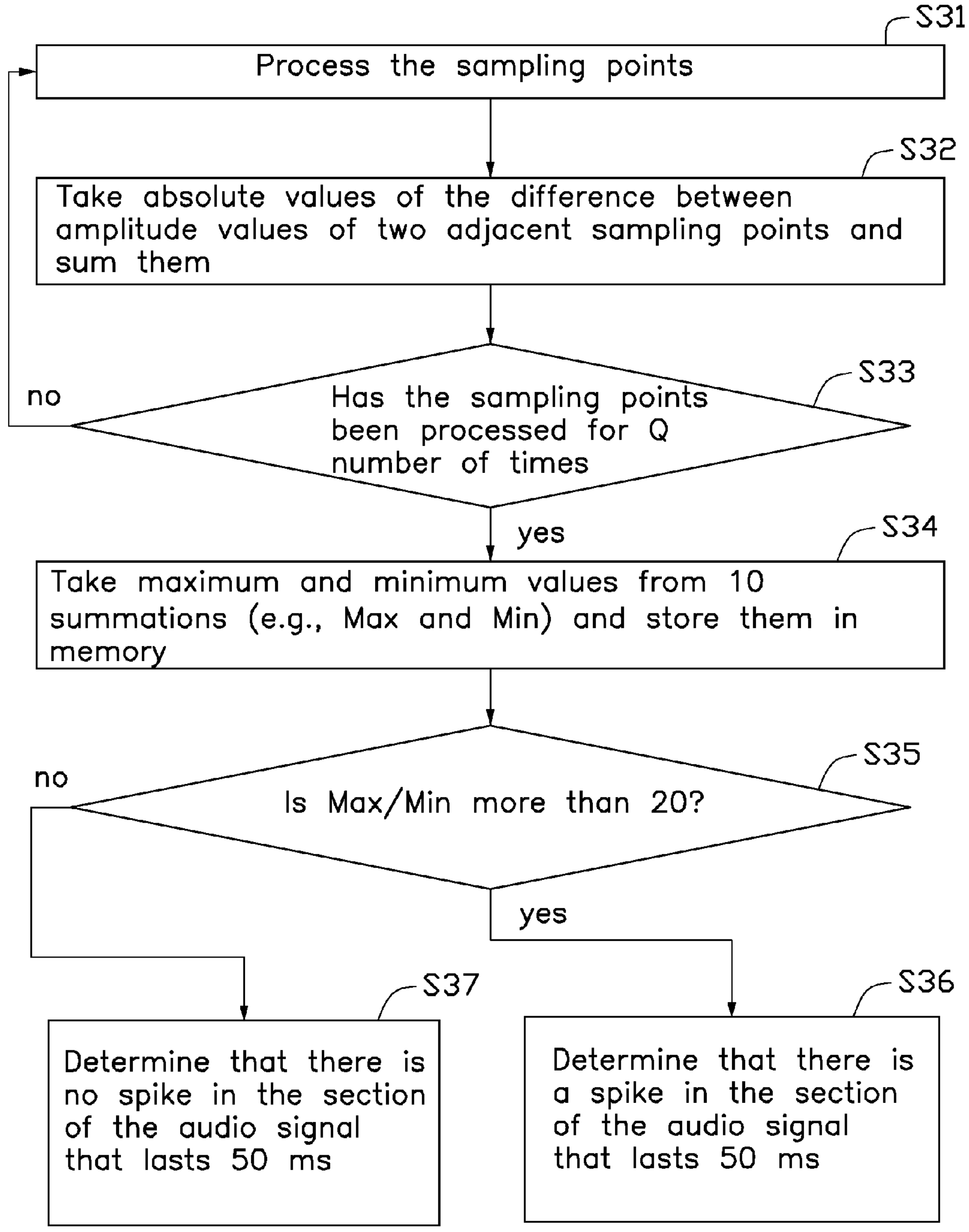
FIG. 5 is a flowchart of a method for testing the spike of FIG. 2.

FIG. 5 is a flowchart of an audio testing method for testing the spike in step S4 of FIG. 2. In step S31, the processing module 14 processes the sampling points stored in the memory 30 into sampling regions P. Depending on the embodiment, P may range between 3-10 ms. In this embodiment, P is equal to 5 ms. Due to the sampling rate of 44.1 KHz, there are about 220 sampling points in an audio signal section that lasts 5 ms.

In step S32, the processing module 14 takes the absolute values of differences between the amplitude values of each two adjacent sampling points, and adds up all 219 absolute values, then stores the summation of the 219 absolute values in the memory 30.

In step S33, the processing module 14 determines if it has processed sampling points for Q times. If the processing module 14 has processed sampling points for Q times, the process goes to step S34. If the processing module 14 has not processed sampling points for Q times, the process returns to step S31. Q may range between 5-10. In this embodiment, Q is equal to 10.

In step S34, there are 10 summations in the memory 30. The processing module 14 takes maximum values and minimum values from the 10 summations, namely Max and Min, and stores them in the memory 30.

In step S35, the processing module 14 determines if the Max/Min is equal to S. S may range between 20-30 in one embodiment. In this embodiment, S is equal to 20.

In step S36, if the Max/Min is more than 20, the processing module 14 determines that there is a spike in the audio signal section that lasts 50 ms.

In step S37, if the Max/Min is equal to or less than 20, the processing module 14 determines that there is no spike in the audio signal section that lasts 50 ms.

For balancing the testing time and the test precision, P is equal to 5 ms and Q is equal to 10. In step S35, S may range between 20-30 based on a typical person's hearing ability. If the spike audio lasts less than 20 ms, it would be difficult for a typical person to identify this spike audio.

The aforementioned testing process includes the process for testing a break in audio, the process for testing a pause in audio, and the process for testing a spike audio. Testers can choose one or more processes for testing audio according to specific needs.

The foregoing description of various inventive embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skill in the art to which the present disclosure pertains without departing from its spirit and scope. Accordingly, the scope of the present disclosure is defined by the appended claims rather than the foregoing description and the various inventive embodiments described therein.

What is claimed is:

1. An audio testing method for testing an audio signal, the method comprising:

providing a computer system having a sound card connected to an audio-emitting device;

receiving an audio signal from the audio-emitting device;

sampling the audio signal for obtaining sampling points;

storing the sampling points in a memory system of the computer system, wherein the sampling points are divided into a plurality of groups, the sampling points sampled in each continuous P milliseconds (ms) form one of the groups of sampling points, and P ranges between 3 and 10 ms;

processing each group of sampling points stored in the memory;

taking differences between amplitude values of each two adjacent sampling points via subtraction;

taking the absolute values of all the differences and adding up all of the absolute values;

determining if the sampling points has been processed for Q times, wherein Q ranges between 5-10;

taking maximum values and minimum values from the summations, namely Max and Min upon the condition that the computer system has processed sampling points for Q times;

processing the sampling points stored in the memory into P number of sampling regions again upon the condition that the computer system has not processed sampling points for Q times;

determining if the Max/Min is equal to S, wherein S may range between 20-30;

determining that the audio signal has been distorted upon the condition that the Max/Min is equal to or more than S; and determining that the audio signal has been not distorted upon the condition that the Max/Min is less than S.

2. The audio testing method of claim 1, further comprising attenuating noises in the audio signal from the audio emitting device via an attenuation circuit, wherein the attenuation circuit is connected between the audio emitting device and the computer system.

3. The audio testing method of claim 1, wherein P=5, Q=10, S=20.

4. The audio testing method of claim 1, wherein upon the condition that the audio signal has been distorted, the audio testing method further comprises:

recording the audio signal as a digital audio signal, and storing the digital audio signal into the memory.

5. The audio testing method as claimed in claim 4, wherein after the storing step, the computer system records a section of the distorted audio signal into a log file.

* * * * *